Nov. 24, 1953  J. W. CLOKEY ET AL  2,660,682
COMMUTATOR CONNECTION FOR DYNAMOELECTRIC MACHINES
Filed Nov. 4, 1949

WITNESSES:
Edward Michaels
Nw. L. Groome

INVENTORS
John W. Clokey &
Ernest M. Laughner.
BY
B. L. Zangwill
ATTORNEY

Patented Nov. 24, 1953

2,660,682

UNITED STATES PATENT OFFICE 2,660,682

COMMUTATOR CONNECTION FOR DYNAMO-ELECTRIC MACHINES

John W. Clokey, Pittsburgh, and Ernest M. Laughner, Jeannette, Pa., assignors to Westinghouse Electric Corporation, East Pittsburgh, Pa., a corporation of Pennsylvania Application November 4, 1949, Serial No. 125,416

17 Claims. (Cl. 310—234)

From a broad aspect, this invention relates to the rapid securing, as by brazing, of a first series of spaced members to a second series of spaced members by high-frequency induction heating. From a particular aspect, this invention is directed to the construction of an armature for a dynamo-electric machine, the armature having armature-coils or conductors provided with conductor leads that must be intimately and tightly secured to the commutating means or short-circuiting ring of the armature.

It is known that a consideration in the rating of a dynamo-electric machine is the ability of the joints between its armature conductor leads and its commutator-bar necks, or risers, or its short-circuiting ring to withstand heat, high speeds, vibration and shock. As more fully explained in Davis Patent No. 2,387,885, issued October 30, 1945, in connection with a commutating-type machine to which our invention is not limited, it is particularly difficult to braze the leads to the commutator-bar necks, especially with the leads one above the other, as is frequently desired in traction motors and other machines; and it is a common practice to braze a single commutator-bar neck to one or more of its associated leads, one joint at a time.

An object of the invention is to provide a manner of secured conductor leads or connecting straps of a dynamo-electric machine to other conductors to which electrical connections must be made, the improved process taking but a small fraction of the time required by prior processes for the purpose. The process is especially useful in making connecting joints between conductors which are compactly arranged and leave but little space for receiving heating tools. The process can be used, for example, to braze compensating in-straps to different compensating-winding bars in different pole faces, to braze armature conductor bars to short-circuiting rings of squirrel-cage rotors, and to braze armature conductor leads to commutator-bar necks of a commutating machine. In accordance with the preferred application of our invention, the brazing is done automatically and progressively until all of the leads have been secured to their associated conductor connections.

An object of the invention is to provide a means and method for brazing crowded conductors in a dynamo-electric machine by high-frequency heating.

A broad object of the invention is to provide a method of using high-frequency induction heating for brazing or soldering a plurality of spaced members to a second plurality of crowded spaced members, the securing being done simultaneously on several of the associated groups of spaced members and progressively until all of the members of the first set are secured to the members of the second set. In accordance with this aspect of our invention, wedges are driven in the spaces or slots between the spaced members for holding each member against another to which it is to be joined. High-frequency energy is used to induce heat in the parts for heating the joints. The wedges provide an intimate contact with and between the associated members over a large area so that good heat distribution is obtained over the joints. The use of high frequency limits the induced heat to the vicinity of the joints, and the danger of burning is minimized.

The invention can be better understood in connection with a preferred application thereof to a direct-current commutating machine. In accordance with our invention, a preliminary armature construction is provided for the machine which has its conductor leads arranged most conveniently in each slot associated with its commutator-bar necks. Wedges hold and press the leads against the necks, with brazing material therebetween. In this way, a preliminary armature construction is made. High-frequency heating is then induced in the wedged parts so as to melt the brazing material to form a brazed joint between the conductor leads and the commutator-bar necks. Preferably, the high-frequency heating is induced in the parts by a stationary induction-heating coil alongside the parts, the preliminary armature being slowly turned so that the joints are progressively formed until all the commutator leads have been brazed to their associated commutator-bar necks. The process makes it possible to braze leads to the commutator-bar necks of a machine in much less time than has been heretofore possible, to braze leads to the commutator-bar necks without bending the necks, such as is required when brazing tongs are used, to provide brazed joints of greater strength in machines, and to provide such joints in machines having crowded end turns at the commutator-bar necks.

Many features, advantages, objects, combinations and methods of our invention, in addition to the foregoing, will be discernible from the following description of a preferred application thereof, to which our invention is not limited except as required by the prior art. The description is to be taken in conjunction with the accompanying drawings in which many conventional details have been omitted in the interests of clarity and brevity. In the drawings.

Figure 1:
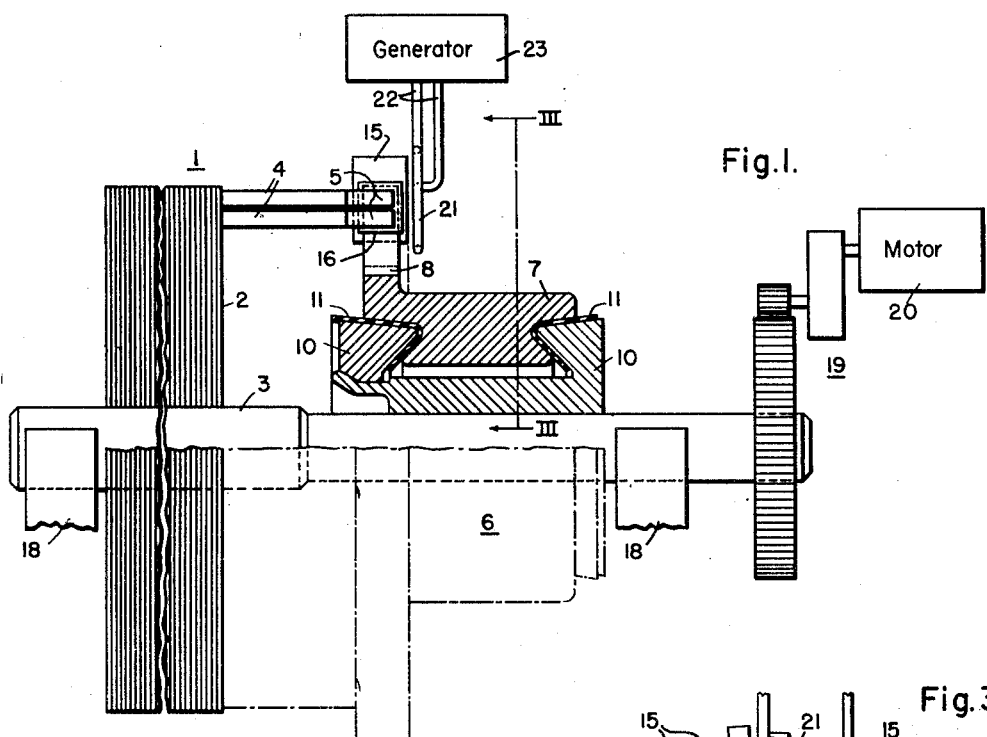
Figure 1 is a partial longitudinal section view of apparatus embodying our invention.

A typical armature construction, identified completely by the reference numeral 1, comprises a round laminated armature core 2 mounted on a shaft 3 in the usual manner. The armature core 2 receives an armature winding of any suitable type which may include a plurality of armature coils or conductors 4 in spaced slots in the periphery of the armature core, these coils or conductors having armature conductor ends or leads 5 of copper that must be secured to the commutating means of the armature. Hence, the leads constitute a plurality of closely spaced metallic members.

The commutating means comprises a commutator 6 formed of a plurality of copper commutator bars 7, each having a substantially radial connection end in the form of a neck or riser 8, the necks lying substantially in a radial plane at the inner end of the commutator. The bars are separated by sheets of mica or other suitable insulation 9. The commutator bars may be clamped between metal V-rings 10 mounted on the shaft 3 in any desired manner, and insulated from the commutator bars by mica V-rings 11.

The commutator-bar necks 8 of the commutator are relatively insulated and circumferentially spaced, and provide similarly spaced radially extending slots 12. Hence, the commutator is a round machine member providing broadly a plurality of closely spaced metal connection members (specifically the bar-end necks 8) and providing broadly a plurality of spaced slots which receive conductor ends (specifically the leads or straps 5) that are to be joined to the first said members.

Figure 3:
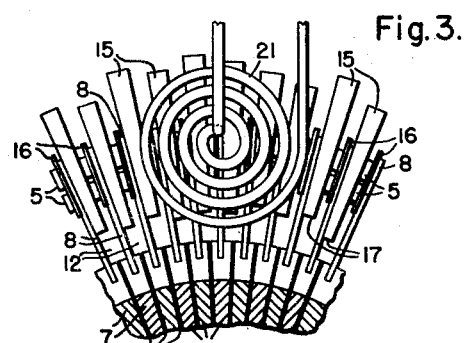
Figure 3 is a view partly in section on line III—III of Figure 1, showing a span of several commutator-bar necks of the preliminary armature.
Figure 2:
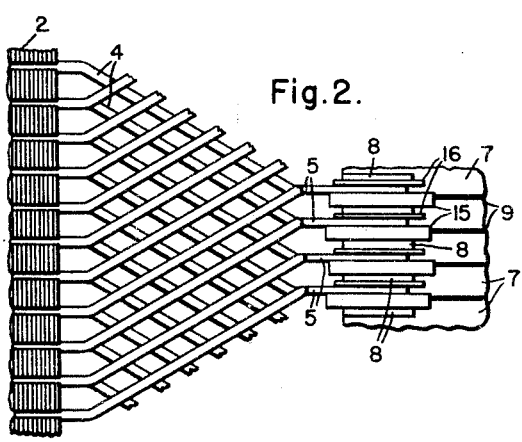
Figure 2 is a fragmentary developed plan view of part of the preliminary armature construction of the apparatus shown in Figure 1, the thicknesses of the brazing material being exaggerated for clarity of illustration.
Figure 4:
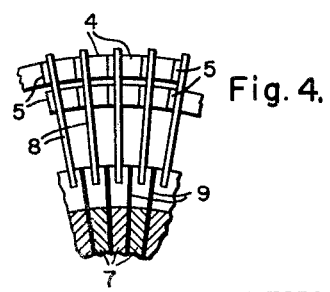
Figure 4 is a partial view, similar to Figure 3, of an armature after the brazing operations have been completed and the wedges removed.

Different arrangements of conductor leads in spaced slots of a dynamo-electric machine are known, and our invention is not limited to any particular arrangement. Usually, in wound machines, the leads 5 for each commutator-bar neck 8 come from different sides of different armature coils. In the preferred embodiment being described, the leads associated with any one of the commutator-bar necks are placed edge facing edge, as shown in Figures 3 and 4, because of the limited circumferential extent of each slot 12 in the machine of the preferred embodiment.

In accordance with our invention, wedges 15 are manually driven in the slots 12 after brazing material 16 has been placed between the necks 8 and the associated conductor leads 5. The wedges 15 firmly press the associated conductor leads 5, commutator-bar necks 8 and brazing material 16 together for intimate electrical and thermal contact over a relatively wide area. It is to be observed that, preferably, the wedges are shaped so that their bottom edges 17 extend below the radially innermost conductor leads 5, and so that each wedge firmly presses against both leads in each slot 12. However, exact radial dimensions are not required, and considerable tolerance is permissible as shown in the drawing. Additionally, for practicable reasons, it is desirable to provide wedges of slightly different thicknesses that can be selected as wedges are being driven into the slots 12, especially when nearing completion of the preliminary armature.

In accordance with our invention, the armature is rotatably and removably carried in open bearings 18 in which the armature can be manually turned while the wedges 15 are driven in place, any suitable hammer being recommended for such driving. The bearings 18 are spaced to receive the shaft 3 with some overhang which can be engaged by gearing 19 for turning or rotating the armature, preferably at a very slow, adjustable, constant speed. To this end, the gearing 19 comprises an electric motor drive 20.

In accordance with our invention, a high-frequency induction-heating coil is used to secure the leads 5 to the necks 8. In the embodiment shown, this coil is a flat pancake-type coil 21 having several turns and having a maximum diametrical dimension that is greater than the radial distance occupied by the conductor leads 5 in each slot 12. This coil 21 is held in stationary position by power-feed conductors 22 that receive high-frequency energy from a suitable source of high-frequency power supply 23.

When high-frequency energy is applied to the coil 21, it heats the parts which face it. This means that the pertinent wedges 15, and associated commutator-bar necks 8, armature conductor leads 5 and brazing material 16 near the coil 21 will have heat generated in them in accordance with the resistivity and permeability of the respective materials, and the frequency of the power supply, as is known to the art. In general, we prefer to make the wedges of a material which has a higher product of resistivity and permeability than the copper of the armature conductor ends or leads 5 and commutator-bar ends or necks 8. Accordingly, most of the heat is concentrated in the wedges which initially become very hot, much hotter than the leads or necks. Heat from the wedges passes by conduction through the leads and necks to aid the heating of the brazing material to brazing temperatures. The degree to which the wedges are heated is also determined by their axial length, which length obviously is subject to choice. In an application using a non-magnetic brazing material which was three mils thick and had a composition of about 15% silver, 80% copper and 5% of phosphorous, we found that stainless steel made very satisfactory wedges, the stainless steel having a composition consisting of 18% chromium, 8% nickel, balance iron. The resistivity of the brazing material and copper was negligible as compared to that of the stainless steel which was about 72 ohms per cubic centimeter at room temperature, and about 118 ohms per cubic centimeter at 650° C.

Stainless steel wedges are preferred to magnetic iron wedges. Magnetic iron wedges have a tendency to scale and cannot be used repeatedly the same as the stainless steel wedges.

It is to be observed that in the embodiment shown, the induction-heating coil spans several commutator-bar necks 8 and the slots 12 therebetween. In order to heat the full circumferential distribution of the joints between all of the commutator-bar necks and armature conductor leads, the shaft 2 is preferably rotated automatically at a uniform speed by energizing the gearing 19. Consequently, when the induction heating coil 21 is energized, the motor 20 is also energized so that the armature rotates at a slow uniform speed for progressively and successively bringing the various joints to be brazed alongside the coil 21. As each joint moves past the coil 21, it cools. After all joints have been heated, the coil 21 is deenergized; and after all joints have cooled to handling temperatures, the wedges 15 are removed for reuse.

In accordance with the aforesaid application of the invention, we have been able to secure untinned armature leads that were lapped against commutator-bar necks in a matter of twenty minutes. The armature contained approximately 190 joints and the pancake induction heating coil spanned four commutator-bar necks. The armature was rotated at a speed of approximately one revolution in twenty minutes, and the frequency of the power supplied to the coil was 450 kilocycles per second obtained from a tube-oscillator generator. It is of interest to note that the armature completed in twenty minutes with the use of our invention previously required approximately fourteen hours to complete when the brazing was done by means of tongs with carbon jaws. Additionally, the joints formed with induced heat, as described, were superior because of the fact that the heat, while concentrated at the vicinity of a joint, is more uniformly distributed thereover.

While we have described our invention in the preferred application with respect to the joining of armature conductor leads to the commutator-bar necks of the commutator of a commutating type of dynamo-electric machine, it is obvious that the principles of the invention are applicable to other dynamo-machines having limited space in which joints must be formed without damage to the conductors or insulation of the machine, and the claims should be interpreted with this in mind. It is also to be understood that a soldering operation is within the scope of brazing operation in accordance with our invention, and such soldering is intended to be encompassed in the term "brazing" or similar terms.

We claim as our invention:

1. A construction for providing a member for a dynamo-electric machine, said construction comprising an armature member having a plurality of armature conductors, a cooperating circular member having a plurality of axially extending circumferentially spaced slots with metal therebetween, said armature conductors having a plurality of conductor ends in said slots, and a joint-forming material and a wedge in each of said slots wedging a number of said conductor ends against the metal at the associated slot, with joint-forming material between such conductor ends and the adjacent metal.

2. A construction for providing part of a dynamo-electric machine, said construction comprising, in combination, a round member having a plurality of slots in its periphery, a plurality of conductors in said slots, said conductors having spaced leads extending outwardly from said member, a plurality of conductor ends and wedges in the spaces between said leads, each wedge wedging a number of said leads and conductor ends together in a joint with brazing material therebetween.

3. A construction for providing part of a dynamo-electric machine, said construction comprising, in combination, a first round member having a plurality of spaced slots in its periphery, a plurality of conductors in said slots, said conductors having spaced leads extending outwardly from said member; a second round member having a plurality of slots and connection ends therebetween; a shaft carrying said members; wedges in the last said slots, each wedge wedging a number of said leads and connection ends together in joints with brazing material therebetween; said wedges, connection ends and conductor leads lying substantially in a plane perpendicular to said shaft; and a high-frequency heating coil supported to induce heat in a number of said wedges.

4. A construction for providing part of a dynamo-electric machine, said construction comprising, in combination, a first round member having a plurality of spaced slots in its periphery, a plurality of conductors in said slots, said conductors having spaced leads extending outwardly from said member; a second round member having a plurality of slots and insulated metal bars around its periphery; a shaft carrying said members; wedges in the last said slots, each wedge wedging a number of said leads and one of said bars together in a joint with brazing material therebetween; said wedges, bars and conductor leads lying substantially in a plane perpendicular to said shaft; a high-frequency heating coil supported to induce heat in a number of said wedges; means for supporting said shaft for turning movement, with said wedges adapted to successively pass said heating coil; and means for uniformly turning said shaft.

5. A construction for providing an armature of a dynamo-electric machine, said construction comprising a shaft, an armature member carried by said shaft, said armature member having armature conductors and a commutator comprising a plurality of axially extending metallic bars having radially extending necks at one end thereof, the necks being circumferentially spaced, said armature conductors having a plurality of leads adapted to be connected to said necks, said leads being divided into groups with each group being associated with one of said necks, metallic wedging means pressing each group of leads against the associated neck, a high-frequency heating coil supported to induce heat in said wedging means, and means supporting said armature member for turning movement past said coil.

6. A construction for providing an armature of a dynamo-electric machine, said construction comprising a shaft, an armature member carried by said shaft, said armature member having armature conductors, a commutator comprising a plurality of axially extending metallic bars having radially extending necks at one end thereof, the necks being circumferentially spaced, said armature conductors having a plurality of leads adapted to be connected to said necks, said leads being divided into groups with each group being associated with one of said necks to form a joint, a mass of high-melting-point material between each of said groups and the associated neck, wedge means pressing a plurality of said groups of leads against the associated necks with the associated material therebetween, and a high-frequency induction heating coil at said end of said commutator to heat said joints.

7. A construction as defined in claim 6 but further characterized by said wedge means comprising a metallic wedge in each of a plurality of spaces between said necks, the wedges being of higher resistivity than said necks and leads.

8. A construction as defined in claim 7 but further characterized by said high-frequency heating coil comprising a pancake-type coil substantially paralleling the radial direction of said necks, and spanning a plurality of said necks.

9. A construction for providing an armature of a dynamo-electric machine, said construction comprising an armature member having armature conductors, a central shaft, a commutator comprising a plurality of axially extending metallic bars having radially extending necks at one end thereof, the necks being circumferentially spaced and providing a plurality of circumferentially spaced slots, said armature conductors having a plurality of leads adapted to be connected to said necks, said leads being divided into groups with each group being associated with one of said necks, a mass of high-melting-point material between each of said groups and the associated necks, and a stainless steel wedge in each of said slots, each wedge pressing a group of said leads against the associated neck with the associated brazing material therebetween.

10. A construction for providing an armature of a dynamo-electric machine, said construction comprising an armature member having armature conductors, a central shaft, a commutator comprising a plurality of axially extending metallic bars having radially extending necks at one end thereof, the necks being circumferentially spaced and lying in substantially a common radial plane, and providing a plurality of circumferentially spaced slots, armature conductors having a plurality of leads adapted to be connected to said necks, said leads being divided into groups with each group being associated with one of said necks, a mass of high-melting-point material between each of said groups and the associated neck, a strainless steel wedge in each of a plurality of said slots pressing a group of said leads against the associated neck with the associated brazing material therebetween, and a high-frequency heating coil having a turn near said plane.

11. A construction for providing an armature of a dynamo-electric machine, said construction comprising an armature member having armature conductors, a central shaft, a commutator comprising a plurality of axially extending metallic bars having radially extending necks at one end thereof, the necks being circumferentially spaced and providing a plurality of circumferentially spaced slots, said armature conductors having a plurality of leads adapted to be connected to said necks, said leads being divided into groups with each group being associated with one of said necks, a mass of high-melting-point material between each of said groups and the associated neck, a stainless steel wedge in each of said slots pressing a group of said leads against the associate neck with the associated brazing material therebetween, means for uniformly turning said armature member, and stationary high-frequency induction heating means alongside the path in which said necks and wedges turn.

12. A construction as defined in claim 11 but further characterized by said heating means comprising an induction heating coil having a turn spanning a plurality of said necks.

13. A construction as defined in claim 12 but characterized by said coil comprising a pancake-type coil.

14. A method of securing a first set of spaced metal members individually to a second set of spaced metal members, comprising placing the first set of said members in the desired positions in the spaces between the members of the second set, with a joining compound therebetween, placing wedges in each of said last said spaces that press the first said members against the associated ones of said second set of members with the joining compound therebetween, and heating said wedges to a temperature such that the joints between said members are heated by conduction from said wedges to a temperature whereby the brazing operation between said members is effected.

15. A method of securing conductor leads of an armature of a commutating-type dynamo-electric machine to the commutator-bar necks thereof, which method comprises wedging a number of different leads against each neck by respective wedge members, with brazing material between respectively the latter leads and said neck, uniformly turning the armature while the leads are wedged as aforesaid, and heating the wedge members to a temperature such that the brazing compound is heated by conduction from said wedge members as the armature turns.

16. A method of securing crowded spaced leads of a rotatable member of a dynamo-electric machine to other spaced conductors thereof, which method comprises placing stainless steel wedges in the slots provided by the spaced conductors which press said leads to the associated conductor with brazing material therebetween, turning the member while the leads are wedged as aforesaid, and moving said wedges past an energized induction-heating coil at a substantially uniform speed.

17. A method of securing crowded leads of a member of a dynamo-electric machine to other conductor ends thereof, which method comprises placing a number of different leads against each conductor and with brazing material therebetween, pressing the leads in a direction towards the associated conductor ends by the use of respective wedge members, generating heat with high-frequency electrical energy which heats primarily said wedge members to a temperature such that by conduction from said wedge members said conductor ends, leads and brazing compound are heated to form brazed joints between said necks and leads.

JOHN W. CLOKEY.
ERNEST M. LAUGHNER.

References Cited in the file of this patent

UNITED STATES PATENTS

| Number | Name | Date |
| --- | --- | --- |
| 1,063,816 | McLaughlin | June 3, 1913 |
| 2,257,643 | Paschke | Sept. 30, 1941 |
| 2,306,291 | Alons | Dec. 22, 1942 |
| 2,387,885 | Davis | Oct. 30, 1945 |
| 2,397,308 | Barnes | Mar. 26, 1946 |
| 2,442,968 | Bierwirth | June 8, 1948 |
| 2,455,560 | Cobb et al. | Dec. 7, 1948 |
| 2,479,980 | Stanton | Aug. 23, 1949 |
| 2,484,333 | Cobb | Oct. 11, 1949 |
| 2,528,758 | King | Nov. 7, 1950 |

OTHER REFERENCES

Scientific American, June 1941, pages 331-332.
Welding Encyclopedia, 1947 edition, page 655, column 2, first full paragraph, published by the Welding Engineer Publishing Co., New York, New York.